UNITED STATES PATENT OFFICE.

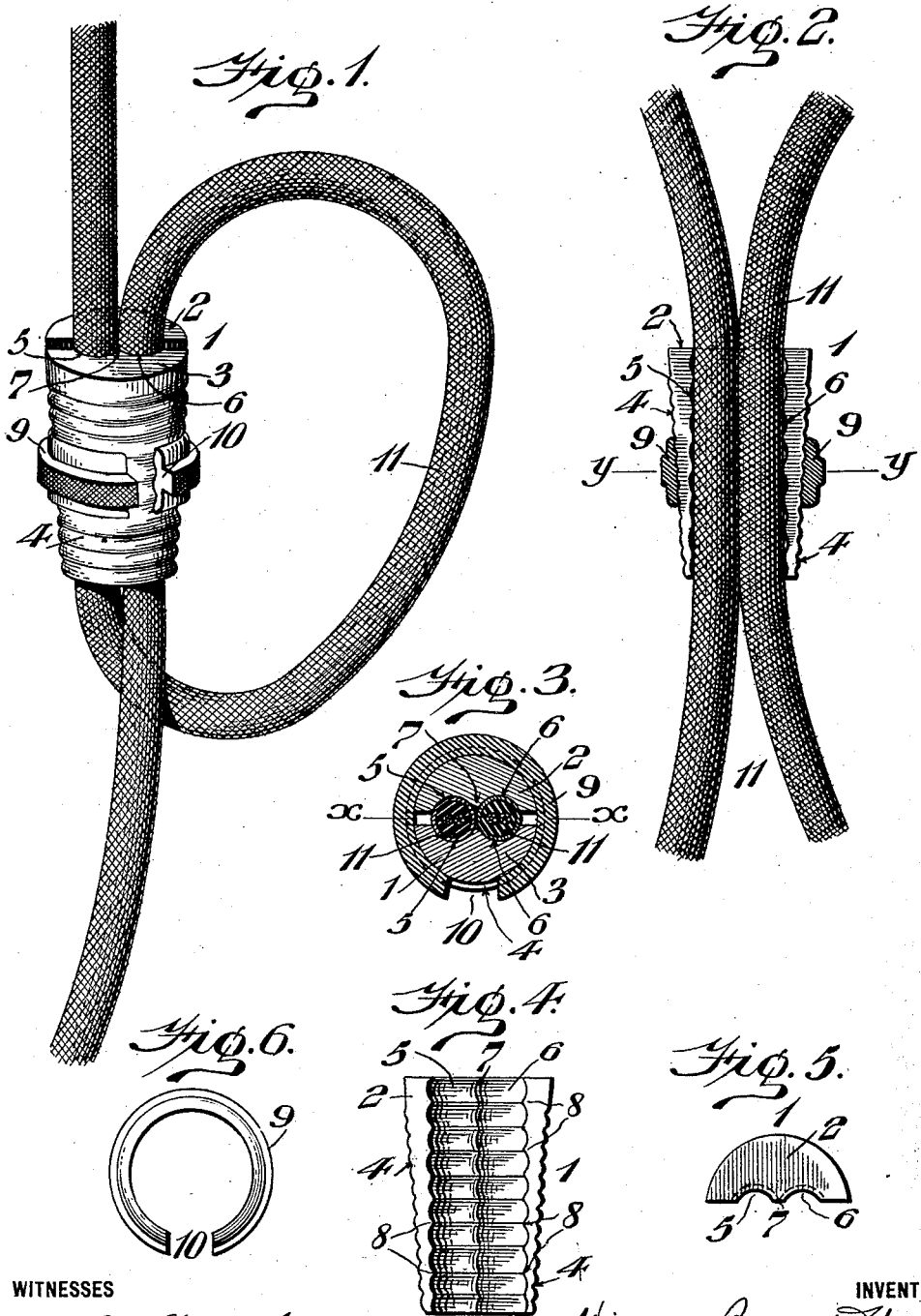

WILLIAM BURNETT STEWART, OF PHILADELPHIA, PENNSYLVANIA.

ELECTRICAL CLAMP OR ADJUSTER.

992,821.  Specification of Letters Patent.  Patented May 23, 1911.

Application filed November 16, 1910. Serial No. 592,641.

*To all whom it may concern:*

Be it known that I, WILLIAM BURNETT STEWART, a citizen of the United States, residing in the city and county of Philadelphia, State of Pennsylvania, have invented a new and useful Electrical Clamp or Adjuster, of which the following is a specification.

My invention relates to a new and useful electrical adjuster or clamp and consists in providing means whereby the adjuster or clamp may be applied to a conductor, cord or cable at any suitable point without the necessity of slipping the same thereon from the end.

It further consists of jaws adapted to engage or embrace the conductor, cord or cable, an open-sided annular clamping member engaging with said jaws causing the same to grip the conductor, cord or cable.

It further consists of other novel features of construction, all as will be hereinafter fully set forth.

Figure 1 represents a perspective view of an electrical adjuster or clamp, embodying my invention, showing the same applied to a conductor. Fig. 2 represents a vertical sectional view on line $x$—$x$ Fig. 3. Fig. 3 represents a sectional view on line $y$—$y$ Fig. 2. Fig. 4 represents an elevation of the inner face of one of the jaws. Fig. 5 represents a top plan view of one of the jaws. Fig. 6 represents a plan view of the open-sided annular clamping member employed.

Similar numerals of reference indicate corresponding parts in the figures.

Referring to the drawings: In the adjusters or clamps now employed it is necessary, in order to connect the same with a conductor, cord or cable, that the said adjuster or clamp be applied from the end of the conductor, cord or cable and slipped thereupon to the desired place.

My invention is designed to overcome these defects and in the drawing I have shown one embodiment of my invention which I have found, in practice, operates successfully, but it will be evident that the arrangement of the parts may be varied, other instrumentalities may be employed and changes made in the construction, which will come within the scope of the invention and I do not therefore desire to be limited in every instance to the exact form, as herein shown and described, but desire to make such changes as may be necessary.

1 designates an electrical adjuster or clamp, the same consisting of the two jaws or jaw members 2 and 3, the outer faces of which are preferably inclined or tapered in order to provide a wedging action and the said outer faces are here shown screw-threaded as at 4. The inner faces of the jaws are each provided with preferably curved recesses 5 and 6, with a partition 7 therebetween and at suitable points in said recesses, I provide the ribs 8 for assisting in gripping the conductors or cords.

9 designates the open-sided annular clamping member which, in the present instance, is shown as a rigid ring provided with an opening or cut away portion 10 forming the open side of the member and the inner wall of the member, in the present instance and as here shown, is threaded, for engagement with the threads 4 on the jaws 2 and 3.

While the device is applicable for a clamp or connection, I have here shown the same employed as an adjuster for an electrical conductor. As is well known, where electrical conductors or cords are used for a connection between a wall piece or stationary socket and a lamp or other device, it often occurs that the conductor may be too long, in which event it is necessary to provide means for taking up the slack.

As is shown in Fig. 1, 11 designates a conductor to which the adjuster is applied, the operation of the same being readily seen and will be similar if used as a clamp for connecting two ends of a conductor, cord or cable. By bringing two portions of the conductor together, forming a hand loop in the conductor, the two jaw members are placed upon the two adjacent portions of the said conductor 11 with a portion of the conductor seated in the recesses 5 and the adjacent portion of the other in the recesses 6. The open-sided clamping member is then applied by passing the two portions of the conductor 11 through the opening 10 and, in the present instance, the clamping member or ring is screwed upon the said jaws 2 and 3, causing the same to tightly grip the conductor and so hold or lock them with respect to the conductor, in the position seen in Fig. 1.

It will of course be understood, by reason of the arrangement of the jaws, that various sized cables may be accommodated and by reason of the inclined outer walls of the jaws, the annular clamping member 9 can always be moved to a position on the jaws, to cause the same to firmly grip the two portions of the conductor 11, or the ends of two conductors.

From the above, it will be seen that I may apply the adjuster or clamp at any point on the conductor 11 and can quickly and easily remove the same, without disturbing the connections, by unscrewing the clamping member 9 and passing the same from the conductor 11 by reason of the cut-away portion 10.

Having thus described my invention, what I claim as new and desire to secure by Letters Patent, is:

In a device of the character stated, separate tapered jaw members adapted to receive a plurality of conductor portions and an open-sided clamping member the opening of which is smaller than the smallest joint diameter of the two jaw members and which is adapted to pass across said portions and engage with the jaws for causing the same to firmly grip and hold the portions.

WILLIAM BURNETT STEWART.

Witnesses:
ROY ELLSWORTH WILLIAMS,
WILLIAM TORREY WALKER.

---

Copies of this patent may be obtained for five cents each, by addressing the " Commissioner of Patents, Washington, D. C."